(12) United States Patent
Asami

(10) Patent No.: US 7,024,560 B2
(45) Date of Patent: Apr. 4, 2006

(54) POWER-RESIDUE CALCULATING UNIT USING MONTGOMERY ALGORITHM

(75) Inventor: Kazuo Asami, Hyogo (JP)

(73) Assignees: Renesas Technology Corp., Tokyo (JP); Mitsubishi Electric System LSI Design Corporation, Itami (JP)

( * ) Notice: Subject to any disclaimer, the term of this patent is extended or adjusted under 35 U.S.C. 154(b) by 964 days.

(21) Appl. No.: 09/877,074

(22) Filed: Jun. 11, 2001

(65) Prior Publication Data

US 2002/0101984 A1 Aug. 1, 2002

(30) Foreign Application Priority Data

Jan. 30, 2001 (JP) .................................. 2001-021128

(51) Int. Cl.
*G06F 9/00* (2006.01)
*H04L 9/00* (2006.01)

(52) U.S. Cl. ....................... 713/182; 713/189; 380/268; 380/265

(58) Field of Classification Search ................. 713/189, 713/182, 200; 380/268, 265
See application file for complete search history.

(56) References Cited

U.S. PATENT DOCUMENTS

| 4,977,595 | A | * | 12/1990 | Ohta et al. ..................... 705/69 |
| 5,961,578 | A | * | 10/1999 | Nakada ....................... 708/491 |
| 6,161,183 | A | * | 12/2000 | Saito et al. .................. 713/176 |
| 6,259,790 | B1 | * | 7/2001 | Takagi et al. .................. 380/30 |
| 6,477,649 | B1 | * | 11/2002 | Kambayashi et al. ....... 713/200 |
| 6,546,104 | B1 | * | 4/2003 | Shimbo et al. ............... 380/28 |
| 6,578,061 | B1 | * | 6/2003 | Aoki et al. .................. 708/520 |
| 6,795,553 | B1 | * | 9/2004 | Kobayashi et al. ........... 380/28 |
| 2002/0101984 | A1 | * | 8/2002 | Asami ........................ 380/28 |
| 2004/0064274 | A1 | * | 4/2004 | Yamaguchi .................. 702/60 |

FOREIGN PATENT DOCUMENTS

| JP | 11212456 | 8/1999 |
| JP | 2000-165375 | 6/2000 |
| KR | 10-0257123 | 2/2000 |
| KR | 2000-0052392 | 8/2000 |

* cited by examiner

Primary Examiner—Norman M. Wright
(74) Attorney, Agent, or Firm—Burns, Doane, Swecker & Mathis, LLP

(57) ABSTRACT

A power-residue calculating circuit includes: an I/F (interface) circuit with respect to an external bus; an e register holding a key e; a Y register holding a multiplier Y for Montgomery conversion; an N register holding a key N; a B2N register holding a value of (2B+N) calculated during the Montgomery conversion; an X register holding a plaintext X; a calculating circuit performing calculations for encryption and decryption; a P register holding a calculation result P; a power-residue control circuit serving as a state machine when the power-residue calculation is performed; a Montgomery multiplication residue/residue control circuit serving as a state machine when the Montgomery multiplication residue calculation and residue calculation are performed; and an addition/subtraction control circuit controlling calculations addition and subtraction.

16 Claims, 6 Drawing Sheets

OVERALL CARRY

SIX STAGES OF SUB ADDERS

POWER-RESIDUE CALCULATING UNIT USING MONTGOMERY ALGORITHM

BACKGROUND OF THE INVENTION

1. Field of the Invention

The present invention relates to power-residue calculating units used for encryption and decryption of information applicable in the fields of telecommunications network, traffic, finance, medical services, distribution and so on. More particularly, the present invention relates to a power-residue calculating unit using a Montgomery algorithm.

2. Description of the Background Art

Owing to the technological development in the field of telecommunication, security (namely, to prevent criminal use or destruction of data) over a communication network has received a great deal of attention. Therefore, encryption and decryption of information are frequently used. The applicable fields of encryption and decryption range from telecommunication to traffic, finance, medical services, distribution and so on. This type of encryption and decryption are required to realize an advanced security based on a simple concept.

To facilitate understanding of this type of technique, a concept of encryption/decryption of information will be briefly described. In the world of encryption, "asymmetric cipher algorithm" is superior. The asymmetric cipher algorithm refers a cipher algorithm using different encryption and description keys, where one of which cannot be "easily calculated" from the other. An RSA (Rivest-Shamir-Adleman scheme) cipher using a power-residue calculation (a residue is obtained by multiplying a certain number X several times and then dividing the result by N) is representative of the asymmetric cipher algorithm.

Basically, the power-residue calculation is used in accordance with the following formula (1) to generate an RSA cipher. Formula (1) implies that a residue is obtained by dividing $X^Y$ by N. In formula (1), X represents a plaintext to be subjected to encryption (decryption), where Y and N are keys for encryption (decryption).

$$X^Y \bmod N \tag{1}$$

The power-residue calculation facilitates encryption and decryption of information. If the operand bit lengths of X, Y, and N are increased, decryption of each key becomes difficult.

However, the greater operand bit length requires a longer period of time for the power-residue calculation. Then, a major point is to reduce the time for the power-residue calculation with a greater operand bit length.

Next, encryption and decryption processes using the power-residue calculation will be described with an RSA cipher by way of example.

[Encryption and Decryption of RSA Cipher]

(1) For decryption of the RSA cipher, the following equation (2) is used.

$$C = M^e \bmod N \tag{2}$$

For decryption, the following equation (3) is used.

$$M = C^d \bmod N \tag{3}$$

Here, M represents a plaintext for encryption, and C represents a plaintext which has been subjected to encryption, i.e., a ciphertext. Further, e and N in equation (2) are encryption keys, whereas d and N in equation (3) are decryption keys. There is a predetermined relationship between the following equations (4) and (5).

$$N = p \cdot q \tag{4}$$

$$1 \equiv e \cdot d \bmod \{LCM(p-1, q-1)\} \tag{5}$$

Here, "≡" indicates that the left and right sides are similar to each other, and "LCM" is an abbreviation for a least common multiple. Further, p and q are relatively prime integers. Note that e and N are public keys, whereas d, p and q are secret keys.

Equations (4) and (5) both define conditions of numeric values for the power-residue calculation in a cipher algorithm. Equation (4) indicates that N is a product of relatively prime large prime numbers p and q. Since p and q are both odd numbers, n should also be an odd number. Equation (5) indicates that a residue, which is obtained by dividing a product of e and d by a least common multiple of values obtained by deducting 1 respectively from p and q shown in equation (4), is 1.

Under the conditions specified in equations (4) and (5), plaintext M is encrypted by equation (2), and encrypted plaintext M (ciphertext C) is decrypted by equation (3).

[Method of Power-Residue Calculation]

A method of a power-residue calculation used for encryption/decryption will now be described. The power-residue calculation for $A = M^e \bmod N$ is carried out with use of an iterative square product method as shown in the following flow 1 with a binary digit expansion of an integer e being $e^{k-1} \ldots e^1 e^0$.

(Flow 1)

begin $A = 1$ for $i = k-1$ to 0 begin $A = A^2 \bmod N$     (6)

If $e^i = 1$ then $A = A \cdot M \bmod N$     (7)

end end

A solution of the power-residue calculation would be equal to A.

As described above, the calculation is based on multiplication and division (mod calculation) as shown in equations (6) and (7). The multiplication provides A×A or A×M for a value of A having an initial value of 1. The division provides modN for a value obtained by each multiplication (a calculation of a residue when divided by N). Calculations are iteratively performed in accordance with a bit value of "e" with a pair of "multiplication and division" (A×AmodN, A×MmodN). More specifically, "multiplication and division" is performed in accordance with each bit starting from the most significant bit to the least significant bit of "e".

As described above, in the power-residue calculation, a solution is obtained by iteratively performing basic residual calculations (mod calculation). The iterative frequency per se is at most several hundreds to several thousands of times, which can be well handled by a software. However, to carry out the residue calculation per se, i.e., division, by a hardware, a large calculation circuit and a complicated process are required, which should be preferably improved. Since large integers of about 1024 bits are usually used for e, d, M, N and so on, even a high-speed exponential calculation still requires multiple precision multiplication and residual calculation of about 1500 times on average per RSA calculation. In particular, various high-speed methods, including an approximation method, residual table method and Montgomery algorithm, have been proposed for the residual calculation.

To increase the speed of the power-residue calculation mostly used for a public key cryptograph representative of the RSA cipher, the speed of one residual calculation must be increased. A Montgomery algorithm provides high speed residual calculation. In particular, in the multiplication residual calculation, division can be simplified by e.g., bit shift. Thus, the power-residue calculation used for a public key cryptograph (e.g., RSA cipher) can be performed at higher speed.

On the other hand, the Chinese remainder theorem provides that a calculation with a composite number being a modulo can be carried out by a calculation where relatively prime factors of the composite number is a modulo. If this is applied to RSA encryption with 1024-bit length, in practice, only a calculating circuit with a modulo of an integer of a 512-bit length (here corresponding to p and q), rather than a power-residue calculating circuit with a modulo N of a 1024-bit length, is required as a hardware. This contributes to miniaturization of the hardware.

As described above, the size of the calculating circuit disadvantageously increases since the power-residue calculation involves a highly complicated process of basic residue calculation (mod calculation). Then, Montgomery has proposed that a solution can be obtained by "multiplication" and a simple bit-string process, rather than by the above described general method of residual calculation (mod calculation). The method proposed by Montgomery will be briefly described in the following.

[Montgomery Algorithm]

A Montgomery algorithm implementing high speed residual calculation will be described.

The Montgomery algorithm is based on the fact that use of residual modulo N (N>1) and a cardinal number R (R>N) which is relatively prime with respect to residual modulo N allows calculation of $TR^{-1} \bmod N$ to be performed only by division by cardinal number R with a dividend being T. This eliminates the need for division by N for the residual calculation. Here, N, R, $R^{-1}$ and T are integers. Dividend T satisfies $0 \leq T < R \cdot N$. $R^{-1}$ is an inverse of cardinal number R according to residual modulo N. Further, consider an integer N' that satisfies a relation of $R \cdot R^{-1} - N \cdot N' = 1$ ($0 \leq R^{-1} < N$, $0 \leq N' < R$). Further, if a power of 2 is used for cardinal number R, the division by cardinal number R can be replaced by a shift operation. Thus, a high speed calculation of $T \rightarrow TR^{-1} \bmod N$ ($TR^{-1} \bmod N$ with a dividend being T) is enabled.

An algorithm MR (T) of $T \rightarrow TR^{-1} \bmod N$ is given below as algorithm 1. Note that in algorithm 1, (T+m·N)/R has been proved to be always devisable.

(Algorithm 1) Algorithm Y=MR (T) of $T \rightarrow TR^{-1} \bmod N$ is given by the following equations.

$$M=(T \bmod R) \cdot N' \bmod R \quad (8)$$

$$Y=(T+m \cdot N)/R \quad (9)$$

if $Y \geq N$ then $Y=Y-N$ $Y<N$ then return Y

A single MR provides only $TR^{-1} \bmod N$ rather than a residue T mod N. Thus, to find residue T mod N, an MR calculation is again performed using a product of MR (T) and preliminary found $R^2 \bmod N$ as shown below.

$$MR(MR(T) \cdot (R^2 \bmod N))$$

$$=(TR^{-1} \bmod N) \cdot (R^2 \bmod N) \cdot R^{-1} \bmod N$$

$$=TR^{-1} \cdot R^2 \cdot R^{-1} \bmod N$$

$$=T \bmod N$$

Thus, residue T mod N can be found.

An algorithm implementing the multiplication residue calculation by the Montgomery method using the iterative square product method (iterative square method) of the power-residue calculation is given below. Search is performed starting from an upper bit of key e and, if the bit value of the key is 1, the Montgomery multiplication residual calculation of MR (X·Y) is performed.

$$Y=Rr(Rr=R^2 \bmod N(R=2^{k+2}))$$

$$X=M$$

$$X=MR(X,Y) \quad (10)$$

$$Y=MR(1 \cdot Y) \quad (11)$$

for j=k to 1 if ej==1 then Y=MR(X·Y)     (12)

if j>1 then Y=MR(X·Y)     (13)

end $$Y=MR(1 \cdot Y) \quad (14)$$

$$Y=Y \bmod N \quad (15)$$

Here, MR (X·Y) and MR (Y·X) are equal, where ej represents j-th bit of key e. In the case of an integer with 512-bit length, k=512. The power-residue calculation of 512 bits can be implemented by the Montgomery multiplication residue calculation of 514 bits and the residual calculation of 512 bits.

The Montgomery multiplication residual calculation result P=MR (B·A) is found in the following manner by a sequential calculation of a cardinal number W which is most suitable for being implemented as a hardware.

$$W=2^d$$

$$N0'=N' \bmod W$$

$$P=0$$

for j=0 to k $$M=(P \bmod W) \cdot N0' \quad (16)$$

$$P=((P+(A \bmod W) \cdot B \cdot W + M \cdot N)/W) \bmod 2^k \quad (17)$$

$$A=A/W \quad (18)$$

end

Here d is a natural number depending on the hardware. Thus, Montgomery multiplication residual calculation result P can be found. Then, 514-bit Montgomery multiplication residual calculation result P=MR (B·A) can be found in the following manner by a sequential calculation of cardinal number 2 where d=1.

$N0'=N'\mod 2$ $P=0$ for $j=0$ to 514

$M=(P\mod 2)\cdot N0'$     (19)

$P=((P+(A\mod 2)\cdot B\cdot 2+M\cdot N)/2)\mod 2^{514}$     (20)

$A=A/2$     (21)

end

As described above, to implement the power-residue calculation, a common practice is to use the Montgomery method for the 512-bit power-residue calculation in the hardware and to use a process making use of the Chinese remainder theorem in the hardware. There are a plurality of methods of implementing to the hardware, which may be employed in practice.

However, in a conventional circuit, a process is performed as shown in FIG. 8. More specifically, a hardware with a circuit making use of the Montgomery method for the 512-bit power-residue calculation is used and equations (10) to (18) are directly carried out. For example, equation (12) is omitted if ej==0. On the other hand, calculation (17) is always carried out. Thus, a complicated process is required and hence higher calculation speed is desired. In addition, since the demands for circuits which is reduced in size and is suitable for an LSI (Large Scale Integration) have been on the increase, the operation process must be simplified as much as possible to reduce the overall calculation amount for higher processing speed.

SUMMARY OF THE INVENTION

The present invention is made to solve the aforementioned problems. An object of the present invention is to provide a power-residue calculating unit capable of performing a high-speed process.

A power-residue calculating unit according to one aspect of the present invention includes: a register holding a value obtained by adding a value that is twice one argument for a Montgomery multiplication residual calculation to a residual modulo; a Montgomery multiplication residual calculation executing portion connected to the register for executing the Montgomery multiplication residual calculation with reference to the value held in the register; and a power-residue calculation executing portion connected to the Montgomery multiplication residual calculation executing portion for input/output with respect thereto for executing the power-residue calculation.

Since a value frequently used for the Montgomery multiplication residual calculation is held at the register, the Montgomery multiplication residual calculation can be carried out at high speed.

Preferably, the power-residue calculation executing portion executes the Montgomery multiplication residual calculation in the Montgomery multiplication residual calculation executing portion independent of each bit value of a binary-coded exponent for executing the power-residue calculation.

The Montgomery multiplication residual calculation is always executed independent of the value of each bit of the exponent. Thus, when the power-residue calculating unit is used for encryption and decryption devices, a resistance to timing is ensured.

More preferably, the power-residue calculating unit further includes a mode register holding a calculation mode of the power-residue calculation executing portion. The power-residue calculation execution portion determines if the Montgomery multiplication residue calculation based on each bit value of the binary-coded exponent is to be executed based on the value held in the mode register for executing the Montgomery multiplication residue calculation.

A determination is made as to if the Montgomery multiplication residue calculation based on each bit value of the binary-coded exponent is to be executed based on the value held in the mode register. Thus, in a test mode, the Montgomery multiplication residue calculation based on each bit value of the binary-coded exponent is executed. In practical use, the Montgomery multiplication residue calculation is always executed independent of each bit value of the exponent. Accordingly, the test time can be reduced and a resistance to timing can be ensured.

More preferably, the power-residue calculation executing portion determines if the Montgomery multiplication residue calculation is to be executed based on each bit value of the binary-coded exponent for executing the Montgomery multiplication residue calculation.

The determination is made as to if the Montgomery multiplication residue calculation is executed based on each bit value of the binary-coded exponent for the Montgomery multiplication residue calculation. Thus, until 1 is appeared as a bit value, the result of the Montgomery multiplication residue calculation is in some cases known in advance. In such a case, a process is omitted for higher process speed.

More preferably, the power-residue calculation executing portion includes an adder adding a bit string of a binary number. The adder includes a plurality of sub adders that divide the bit string of the binary number by prescribed bits and add the divided bit strings.

The adder is divided into the sub adders for a pipeline process, addition can be carried out at high speed. Thus, the power-residue calculation can be executed at high speed.

More preferably, the power-residue calculating unit further includes a circuit connected to the Montgomery multiplication residue calculation executing portion and the power-residue calculation executing portion for taking out and executing a part of the calculation.

Various calculations performed during the power-residue calculation are taken out and executed, various types of encryption processes can be implemented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

[Overall Structure of Power-Residue Calculating Circuit]

Figure 1:
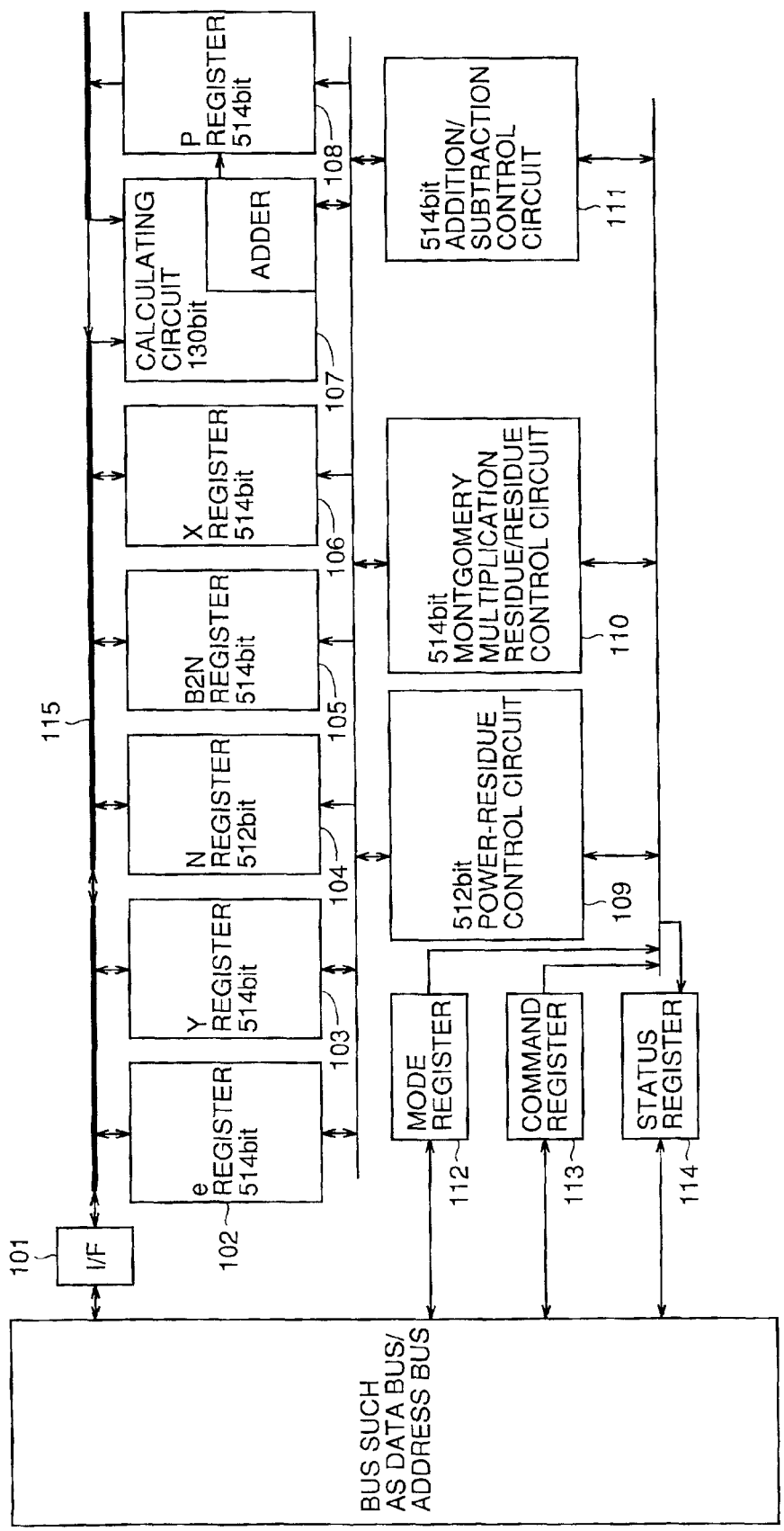
FIG. 1 is a block diagram showing a hardware structure of a power-residue calculating circuit.

Referring to FIG. 1, the power-residue calculating circuit according to the first embodiment of the present invention includes: an I/F (interface) circuit 101 with respect to an external bus; an e register 102 holding a key e; a Y register 103 holding a multiplier Y for a Montgomery conversion; an N register 104 holding a key N; a B2N register 105 holding a value of (2B+N) executed at the time of the Montgomery conversion; an X register 106 holding a plaintext X; a calculating circuit 107 performing calculations for encryption and decryption; a P register 108 holding a calculation result P; and a power-residue control circuit 109 serving as a state machine when the power-residue calculation is executed.

The power-residue calculating circuit further includes: a Montgomery multiplication residue/residue control circuit 110 serving as a state machine when the Montgomery multiplication residue calculation and residue calculation are carried out; an addition/subtraction control circuit 111 controlling calculations of addition and subtraction; a mode register 112 holding various modes; a command register 113 holding a command; a status register 114 holding a status; and an internal bus 115 used for data input/output between various registers and calculating circuit 107.

For the power-residue calculation, a multiplication residue calculation by the Montgomery method is employed for high speed process. Calculation of [2B+N] is performed prior to calculation by the Montgomery method [P=MR (B·A)], and the result is stored in B2N register 105.

The calculation operation of MR (B·A) by the Montgomery method will be described. Here, assume that B=X and A=Y. First, [2B+N] is found. The calculation of [2B+N] is performed as follows. Calculating circuit 107 adds 0 to the value held in N register 104 and stores the value in P register 108. Calculating circuit 107 multiplies the value held in X register 106 by 2, which is then added to the value held in P register 108. The result is written to P register 108. Montgomery multiplication residue/residue control circuit 110 writes the value held in P register 108 to B2N register 105. Then, the calculations in accordance with equations (19), the (20) and (21) are repeated 515 times.

In calculating equation (20) during the Montgomery multiplication residue calculation, data is read out from B2N register 105 if Amod2==1 and M==1, the data read out through internal bus 115 and the value stored in P register 108 are added together in calculating circuit 107. If Amod2==0 and M==1, data is read out from N register 104, and added to the value stored in P register 108 in calculating circuit 107. If Amod2==0, and M==0, addition of [0+P] is performed. The value of 0 is generated for example by rendering the value of data flowing through internal bus 115 0. e register 102, Y register 103, N register 104, and X register 106 respectively hold key e, Y, modulo N and X, whereas P register 108 holds value P of equations (19) and (20) for the Montgomery multiplication residue calculation.

[Structure of Adder Provided in Calculating Circuit 107]

Figure 2:
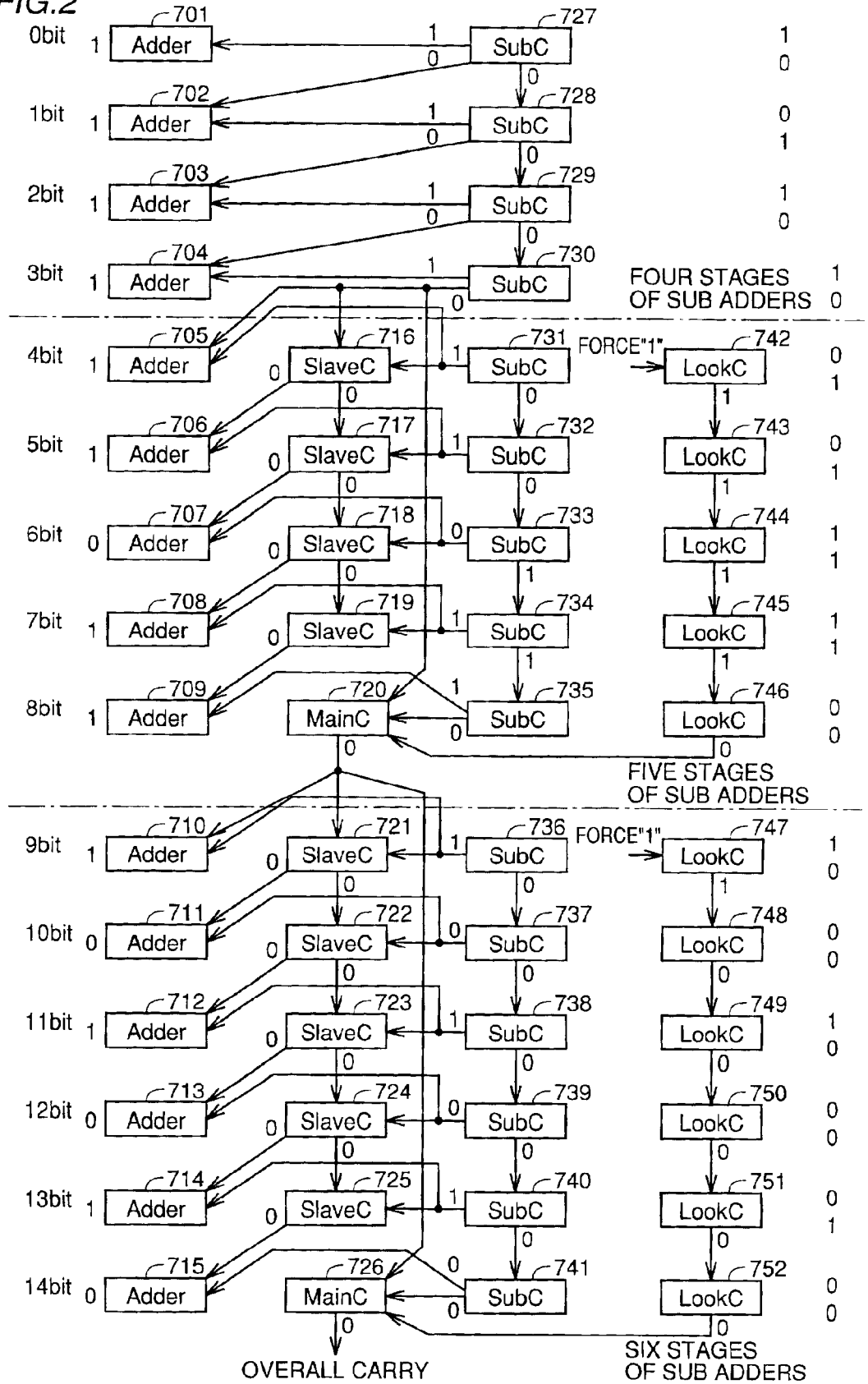
FIG. 2 is a block diagram showing a hardware structure of an adder executing a pipeline process provided in the calculating circuit.

Referring to FIG. 2, the adder for the pipeline process provided in calculating circuit 107 will be described.

The adder has a plurality of sub adders for the Montgomery multiplication residue calculation, having less number of stages for carry. The adder includes: carry circuits (Sub C circuits) 727–741 in the sub adders; carry circuits (Look C circuits) 742–752 indicating possibilities that carries are obtained in the sub adders; carry circuits (Main C circuits) 720 and 726 for propagating carries between the sub adders; carry circuits (Slave C circuits) 716–719 and 721–725 for providing addition results; and adder circuits (adder) 701–715 for actually performing adding processes.

Carry circuits (Look C circuits) 742–752 add bits assuming that a carry is obtained in the lower sub adders and determines a possibility of carry. An exemplary adder performing a 15-bit pipeline process will be described.

In the case of 15 bits, the appropriate number of stages is 4+5+6=15 starting from a low bit. First of all, sub adders in four stages perform additions in a usual manner and then a carry is detected and addition result is obtained. For the sub adders in five stages, the addition result of the five stages is obtained by the Slave C and adder circuits with the carry from four sub adders being added. Meanwhile, the carry solely of the five stages is detected by the Sub C circuit. A carry signal is detected by the Look C circuit assuming that a carry is obtained from the lower bits.

Main C circuit 720 determines which of the signals from Sub C circuit 735 and Look C circuit 745 should be determined as a carry to the following six stages of sub adders in accordance with the carry signal from the four stages of sub adders. Similarly, an addition result is obtained from the six stages of sub adders.

For example, assume that an addition of "1111+1110" is performed in the four stages of sub adders. The operations at respective bits are as follows.

0 bit 0+1=1 no carry 1 bit 1+1=0 carry found 2 bit 1+1+1 (carry from 1 bit)=1 carry found 3 bit 1+1+1 (carry from 2 bit)=1 carry found At the time, a signal indicating "carry" is applied to Main C circuit 720 from Sub C circuit 730. Therefore, Main C circuit 720 outputs a carry of Look C circuits 742–746, obtained by an adding operation assuming that there is a carry from the lower sub adders, to six stages of sub adders as a carry from five stages of sub adders. On the other hand, a signal indicating "no carry" is applied to Main C circuit 720 from Main C circuit 730, and then Main C circuit 720 outputs a carry from Sub C circuit 735.

If the adder is not divided into sub adders, the addition of 14 bits must be performed taking into account a carry from 0 bit. Thus, a period of time corresponding to 14 stages of circuits is required. If divided, however, the carry from 0 bit can be processed in a period of time corresponding to 10 stages of Sub C 727–730, Main C circuit 720, and Slave C circuits 721–725.

In the following, an addition of "000101011001101" and "010000011110010" will be described. Sub C circuit 727 performs an addition (1+0) of 0th bits. The addition result (1) is applied to adder circuit 701. Carry (0) is applied to Sub C circuit 728 and adder circuit 702. Adder circuit 701 outputs the value received from Sub C circuit 727 as an addition result of 0th bit.

Sub C circuit 728 performs an addition of (0+1+0) of the values of the first bit (0 and 1) and carry (0) from 0th bit. The addition result (1) is applied to adder circuit 702. Carry (0) is applied to Sub C circuit 729 and adder circuit 703. Adder circuit 702 adds carry (0) of 0th bit and the addition result (1) of the second bit for outputting the addition result (1) of the first bit. Similarly, in adder circuits 703 to 715, an addition of a carry from lower bits and the addition result of the bit under consideration is performed.

Look C circuit 742 calculates a carry of the fourth bit assuming that a carry is obtained from four stages of sub adders. Namely, an addition of (0+1+1) of the values of fourth bit and carry (1). The carry result is applied to Look C circuit 743. Look C circuit 747 performs a similar process.

Look C circuit 743 performs an addition of (0+1+1) values of the fifth bit and a carry from Look C circuit 742, and applies the carry result (1) to Look C circuit 744. Look C circuits 744–746 and 748–752 also perform similar processes. The output from Look C circuit 746 is applied to Main C circuit 720. An output from Look C circuit 752 is applied to Main C circuit 726.

Sub C circuit 731 performs an addition (0+1) of values of the fifth bit. The addition result (1) is applied to address circuit 705 and Slave C circuit 716. Carry (0) is applied to Sub C circuit 732. Sub C circuit 736 performs a similar process.

Sub C circuit 732 performs an addition (0+1+0) of the values of the sixth bit and carry (0) from the fifth bit. The addition result (1) is applied to address circuit 706 and Slave C circuit 717. Carry (0) is applied to Sub C circuit 733. Similarly, Sub C circuits 733–735 perform an addition of the carry from the lower bits and the value of the bit under consideration. It is noted that the addition result from Sub C circuit 735 is supplied only to adder circuit 709, and the carry of Sub C circuit 735 is applied to Main C circuit 720. Sub C circuits 736–741 perform similar processes.

Slave C circuit 716 adds carry (0) of the third bit and the addition result (1) from the fourth bit, and the carry is applied to adder circuit 706 and Slave C circuit 717. Slave C circuits 717–719 and 721–725 perform similar processes.

Main C circuit 720 applies an output from the Look C circuit to Slave C circuit 721 if the carry of the preceding stages of sub adders output from Sub C circuit 730 is 1. If the carry is 0, it applies the carry output from Sub C circuit 735 to Slave C circuit 721. Main C circuit 726 performs a similar process.

As described above, data of 15 bits are added together. More specifically, after calculations are made in each of Sub C, Look C, and Main C circuits, calculations are further made in Slave C circuit and adder circuit. The adding process is executed in two stages.

There is not a large difference of the number of stages in the case of 15 bits as illustrated above, if an adder with a greater number of bits, e.g., 130 bits, is employed, a processing time corresponding to 129 stages is required if not divided, in contrast to a processing time corresponding to 30 stages if divided. There are five stages of circuits (Sub C circuits 727–730 and Main C circuit 720) used for obtaining a carry from 0th bit input to six stages of sub adders, and there are six stages of circuits (Sub C circuits 736–741 and Look C circuits 747–752, both having six stages) for obtaining a carry of six stages of sub adders. As such, if the adder has a greater number of bits, the effect of the difference in the number of stages can be minimized. As a result, a circuit designing with respect to timing or the like is facilitated and the circuit can be reduced in size.

It is noted that, in an adder for a pipeline process of 130 bits, it is suitable that the adder has sub adders of 4, 5, 6, 7, 8, 9, 10, 11, 12, 13, 14, 15 and 16 stages.

[Power-Residue Calculation Process]

Figure 3:
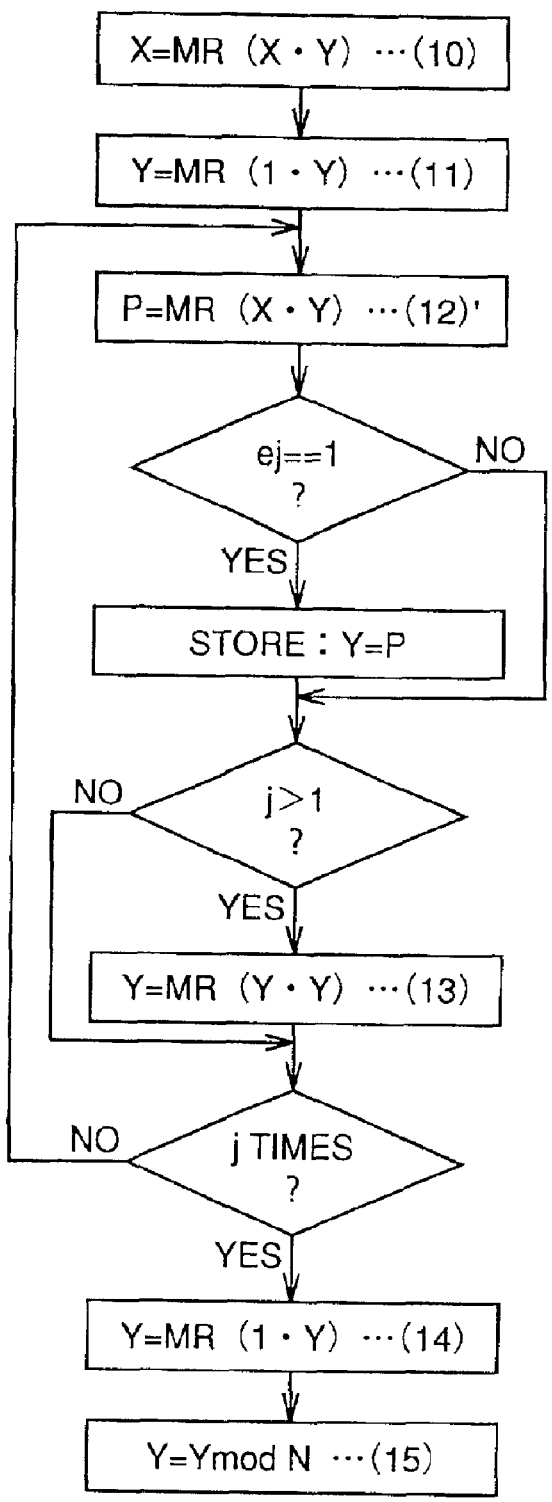
FIG. 3 is a flow chart showing a power-residue calculation process.
Figure 4:
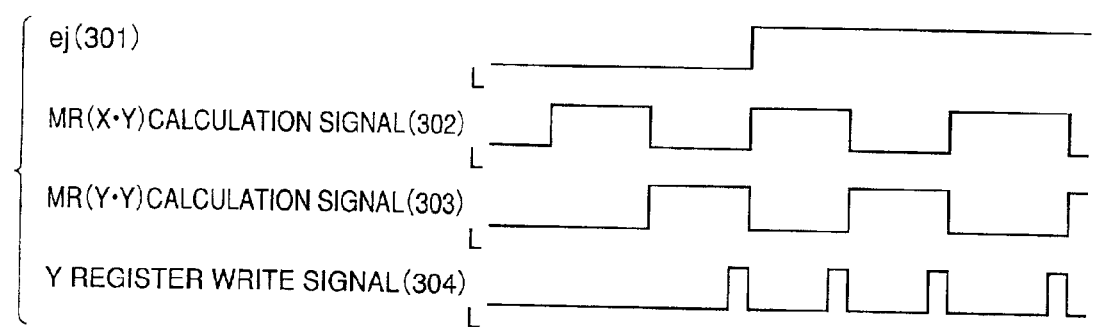
FIGS. 4 to 7 are time charts showing timings of signals.

FIG. 3 is a flow chart showing a power-residue calculating process. FIG. 4 is a time chart showing a timing of a signal.

Conventionally, for the power-residue calculation with use of the multiplication residue calculation by the Montgomery method, a bit of key e is searched and if ej==1, [Y=MR (X·Y)] of equation (12) is executed and, if ej==0, [Y=MR (X·Y)] of equation (12) is omitted. In the present embodiment, [Y=MR (X·Y)] of equation (12) is always executed regardless of the value of ej. The value 301 of ej is determined when the calculation result of equation (12) is stored in Y register 103. If ej==1, a Y register write signal 304 is output and the calculation result is written to Y register 103. If ej==0, Y register write signal 304 is not output and the calculation result is not written to Y register 103. Thus, equation (12) is always carried out so as to provide a constant power-residue calculation time. An MR (X·Y) calculation signal 302 indicates calculation when it is at "H." Y register write signal 303 indicates that data is written to Y register 103 when it is at "H."

As described above, the calculation time remains unchanged regardless of the value of the key because equation (12) is always carried out. As a result, a resistance to timing can be ensured. Note that the resistance to timing refers to a resistance to the event that the cipher is decrypted focusing on a change in the processing time according to a ciphertext or key length.

[Calculation Other Than Power-Residue Calculation]

A power-residue calculating unit includes a power-residue control circuit 109, Montgomery multiplication residue/residue control circuit 110, and an addition/subtraction control circuit 111. Thus, if these control circuits are used independently or in combination, various calculations of the Montgomery multiplication residue calculation, residue calculation, storing calculation, addition, subtraction, conditional addition, conditional subtraction and so on are independently performed.

Since various calculations for the power-residue calculation can be independently carried out, calculation of various ciphers other than RSA cipher can be performed. Further, if the power-residue calculating unit does not operate for some reason, the cause of failure can be detected by independently performing various calculations.

As described above, in the present embodiment, provision of B2N register 105 holding a result of frequently used [2B+N] enables high speed Montgomery multiplication residue calculation and enables simplification of the calculating circuit.

Second Embodiment

A power-residue calculating unit according to the second embodiment of the present invention has a hardware structure similar to that of the first embodiment. Therefore, detailed description will not be repeated here.

Figure 5:
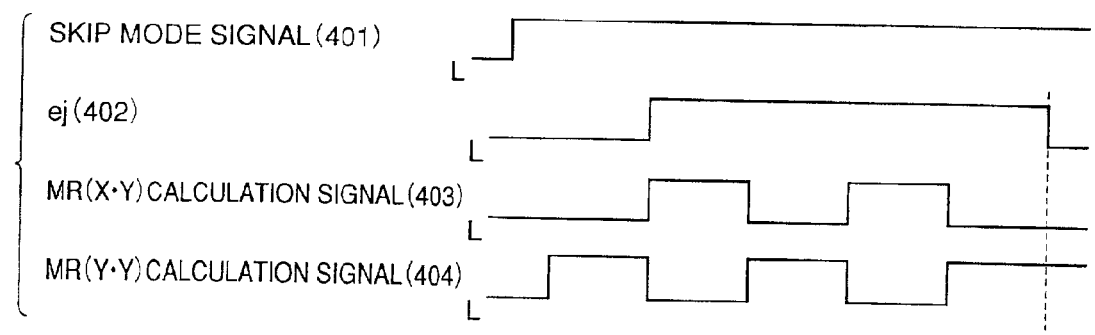

FIG. 5 is a time chart showing a signal timing in the second embodiment. In the present embodiment, a prescribed value is set to mode register 112, so as to provide different executing method of the power-residue calculation.

When a skip mode signal 401 is at "H," only [Y=MR (Y·Y)] of equation (13) is carried out, omitting equation (12) if ej==0. If skip mode signal 401 is at "L," an operation similar to that of the first embodiment is performed.

As described above, since a mode of omitting the calculation of equation (12) is set, the test time can be reduced.

Third Embodiment

The power-residue calculating unit according to a third embodiment of the present invention has a hardware structure similar to that of the first embodiment. Thus, detailed description will not be repeated here.

Figure 6:
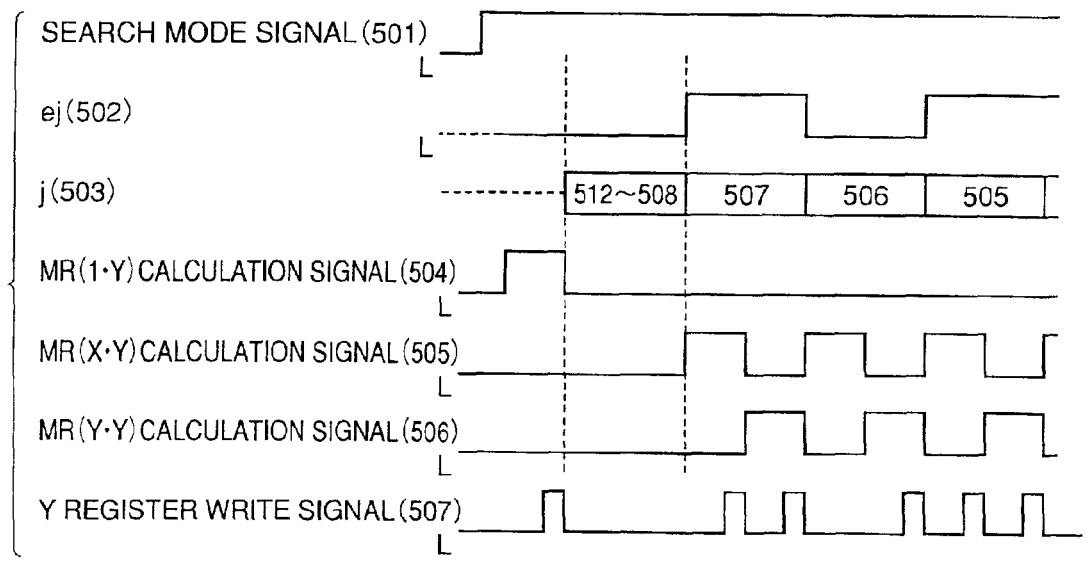

FIG. 6 is a time chart showing a signal timing of the third embodiment.

Execution of the power-residue calculation by a usual method provides a calculation result of equation (11) as expressed below.

$$Y = MR(1 \cdot Y) = 1 \cdot R^2 \cdot R^{-1} \bmod N$$
$$= R \bmod N$$

Between initial point j=k and ej==0, Y remains unchanged in equation (12) as shown according to a conditional equation. Thus, focusing solely on equation (13), the same calculation result would be obtained.

$$Y = MR(Y \cdot Y) = R \bmod N \cdot R \bmod N \cdot R^{-1} \bmod N$$
$$= R \cdot R \cdot R^{-1} \bmod N$$
$$= R \bmod N$$

Y remains unchanged if calculation [Y=MR(Y·Y)] of equation (13) is performed until Y changes by calculation of [Y=MR(X·Y)] of equation (12) at ej==1 as described above. Accordingly, calculations of equations (12) and (13) would be unnecessary until ej==1.

Generally, all calculations are performed to provide a constant operation time. However, by setting a value to mode register 112, a search mode signal 501 attains to "H," and calculation of [j−1] is solely performed without carrying out equations (12) and (13) until ej==1 in iterative calculations (equations (12) and (13)). Thus, a mode of determining if ej ==1 is set.

As described above, since a mode can be set which eliminates the need for calculations of equations (12) and (13), a significant reduction in test time can be achieved depending on the value of key e.

Fourth Embodiment

The power-residue calculating unit according to the fourth embodiment of the present invention has a hardware structure similar to that of the first embodiment. Thus, detailed description will not be repeated here.

Figure 7:
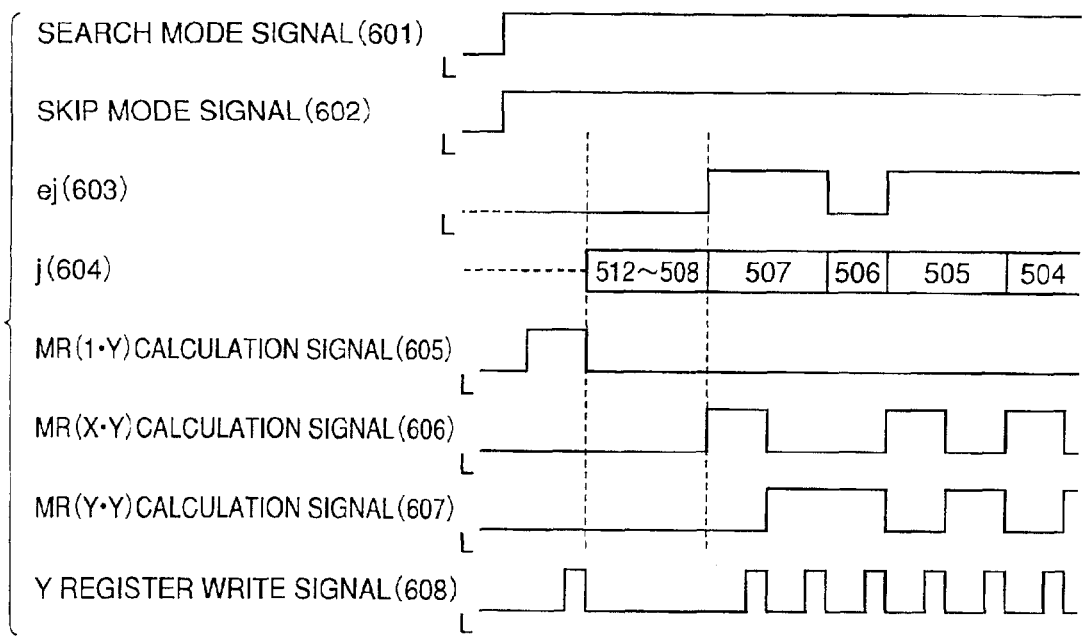
Figure 8:
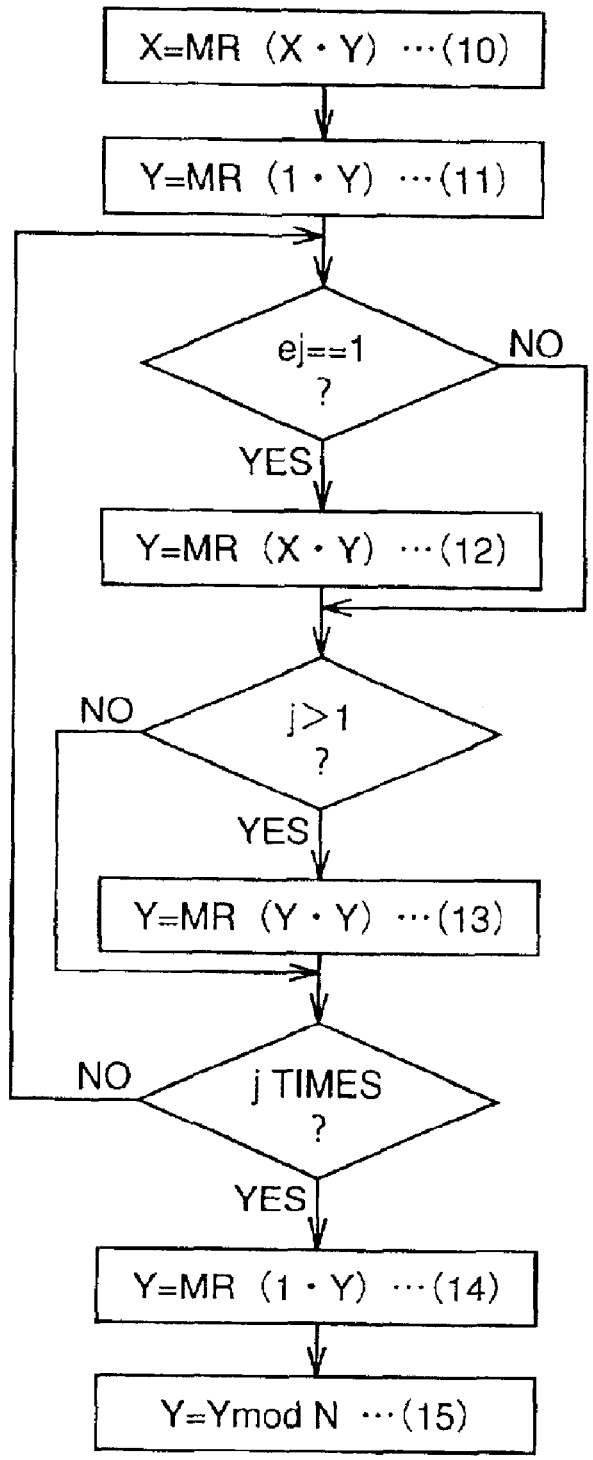
FIG. 8 is a flow chart showing a conventional power-residue calculating process.

FIG. 7 is a time chart showing a signal timing of the fourth embodiment.

In the present embodiment, the skip mode and the search mode, respectively described in the second and third embodiments, can be both set in mode register 112.

For example, if both modes are set, equations (12) and (13) are not carried out until ej==1. Once ej==1, both equations (12) and (13) are carried out. Thereafter, depending on the value of ej, equation (12) is omitted and equation (13) is solely performed if ej==0. Both of equations (12) and (13) are carried out if ej==1.

As in the foregoing, the skip mode and search mode are both set to mode register 112, so that further reduction in test time can be achieved as compared with the second and third embodiments.

According to the present invention, a value frequently used for the Montgomery multiplication residue calculation is held by a register, so that the Montgomery multiplication residue calculation can be performed at high speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power-residue calculating unit for encrypion and decryption of information, comprising:
    input device inputting information for encryption/decryption;
    a register holding a value obtained by adding a value twice one argument for a Montgomery multiplication residue calculation to a residual modulo;
    a Montgomery multiplication residue calculation executing portion connected to said register for executing the Montgomery multiplication residue calculation with reference to a value held in said register and said information;
    a power-residue calculation executing portion, connected to said Montgomery multiplication residue calculation executing portion, for outputting/inputting data with respect to said Montgomery multiplication residue calculation executing portion for a power-residue calculation; and
    output device outputting encrypted/decrypted information.

2. The power-residue calculating unit according to claim 1, wherein said power-residue calculation executing portion executes the Montgomery multiplication residue calculation in said Montgomery multiplication residue calculation executing portion regardless of each bit value of a binary-coded exponent for the power-residue calculation.

3. The power-residue calculating unit according to claim 2, further comprising a mode register holding an operation mode of said power-residue calculation executing portion, wherein
    said power-residue calculation executing portion determines if the Montgomery multiplication residue calculation in accordance with each bit value of the binary-coded exponent is executed based on the value held in said mode register for the Montgomery multiplication residue calculation.

4. The power-residue calculating unit according to claim 2, wherein said power-residue calculation executing portion determines if the Montgomery multiplication residue calculation is to be performed in accordance with each bit value of the binary-coded exponent for performing the Montgomery multiplication residue calculation.

5. The power-residue calculating unit according to claim 2, wherein said power-residue calculation executing portion includes an adder adding a bit string of a binary number, and
    said adder includes a plurality of sub adders dividing the bit string of the binary number by prescribed bits for adding the divided bit strings.

6. The power-residue calculating unit according to claim 2, further comprising a circuit connected to said Montgomery multiplication residue calculation executing portion and said power-residue calculation executing portion for taking out and executing a part of calculation.

7. The power-residue calculating unit according to claim 1, further comprising a mode register holding a calculation mode of the power-residue calculation executing portion, said power-residue calculation executing portion determining if the Montgomery multiplication residue calculation in accordance with each bit value of a binary-coded exponent is to be performed based on a value held in said mode register for performing the Montgomery multiplication residue calculation.

8. The power-residue calculating unit according to claim 7, wherein said power-residue calculation executing portion determines if the Montgomery multiplication residue calculation is to be performed in accordance with each bit value of the binary-coded exponent for performing the Montgomery multiplication residue calculation.

9. The power-residue calculating unit according to claim 7, wherein said power-residue calculation executing portion includes an adder adding a bit string of a binary number, and said adder includes a plurality of sub adders dividing the bit string of the binary number by prescribed bits for adding the divided bit strings.

10. The power-residue calculating unit according to claim 7, further comprising a circuit connected to said Montgomery multiplication residue calculation executing portion and said power-residue calculation executing portion for taking out and executing a part of calculation.

11. The power-residue calculating unit according to claim 1, wherein said power-residue calculation executing portion determines if the Montgomery multiplication residue calculation is to be performed in accordance with each bit value of a binary-coded exponent for performing the Montgomery multiplication residue calculation.

12. The power-residue calculating unit according to claim 11, wherein said power-residue calculation executing portion includes an adder adding a bit string of a binary number, and said adder includes a plurality of sub adders dividing the bit string of the binary number by prescribed bits for adding the divided bit strings.

13. The power-residue calculating unit according to claim 11, further comprising a circuit connected to said Montgomery multiplication residue calculation executing portion and said power-residue calculation executing portion for taking out and executing a part of calculation.

14. The power-residue calculating unit according to claim 1, wherein said power-residue calculation executing portion includes an adder adding a bit string of a binary number, and said adder includes a plurality of sub adders dividing the bit string of the binary number by prescribed bits for adding the divided bit strings.

15. The power-residue calculating unit according to claim 14, further comprising a circuit connected to said Montgomery multiplication residue calculation executing portion and said power-residue calculation executing portion for taking out and executing a part of calculation.

16. The power-residue calculating unit according to claim 1, further comprising a circuit connected to said Montgomery multiplication residue calculation executing portion and said power-residue calculation executing portion for taking out and executing a part of calculation.

* * * * *